(12) United States Patent
Sun et al.

(10) Patent No.: US 6,169,359 B1
(45) Date of Patent: Jan. 2, 2001

(54) ELECTROLUMINESCENT PHOSPHOR THIN FILMS WITH INCREASED BRIGHTNESS THAT INCLUDES AN ALKALI HALIDE

(75) Inventors: Sey-Shing Sun, Beaverton, OR (US); Paul H. Holloway, Gainesville, FL (US); Mark Rogers Davidson, Florahome, FL (US); Karen Elizabeth Waldrip; John S. Lewis, III, both of Gainesville, FL (US); P. Niel Yocom, Princeton, NJ (US)

(73) Assignee: Planar Systems, Inc., Portland, OR (US)

( * ) Notice: Under 35 U.S.C. 154(b), the term of this patent shall be extended for 0 days.

(21) Appl. No.: 09/153,267

(22) Filed: Sep. 14, 1998

(51) Int. Cl.[7] .................... H01J 1/62; H01J 63/04
(52) U.S. Cl. .................... 313/503; 313/502; 313/506
(58) Field of Search .................... 313/498, 501, 313/502, 503, 506, 509

(56) References Cited

U.S. PATENT DOCUMENTS

| | | | |
|---|---|---|---|
| 4,311,487 | * 1/1982 | Luckey et al. .................... | 23/305 RE |
| 5,693,254 | * 12/1997 | Sieber et al. .................... | 252/301.4 H |
| 5,742,322 | * 4/1998 | Cranton et al. .................... | 347/238 |
| 5,939,825 | * 8/1999 | Sun et al. .................... | 313/503 |

* cited by examiner

Primary Examiner—Nimeshkumar D. Patel
Assistant Examiner—Richard J. Smith
(74) Attorney, Agent, or Firm—Chernoff, Vilhauer, McClung & Stenzel, LLP

(57) ABSTRACT

The luminance of a phosphor suitable for an alternating current thin-film electroluminescent device is substantially improved according to the present invention by including an alkali halide. The alkali halide included within the bulk of the phosphor material results in providing a significant number of trapping states which trap free electrons within the phosphor material. The addition of the trapping states (added defects) within the bulk tend to control the electrical and optical characteristics of the phosphor material. This reduces asymmetric light output characteristics of traditional phosphor material, reduces asymmetric current movement within the phosphor material, and decreases the influence of the interfaces between the phosphor material and insulating materials resulting in decreased aging and increased brightness.

11 Claims, 2 Drawing Sheets

ELECTROLUMINESCENT PHOSPHOR THIN FILMS WITH INCREASED BRIGHTNESS THAT INCLUDES AN ALKALI HALIDE

BACKGROUND OF THE INVENTION

The present invention relates to thin film electroluminescent phosphor material.

Thin films of rare earth doped alkaline earth sulfides, such as cerium doped strontium sulfide, have been extensively investigated for applications in full color alternating current thin film electroluminescent (ACTFEL) display devices. Such a device is disclosed by Barrow et al., U.S. Pat. No. 4,751,427, incorporated by reference herein. The emission spectrum of SrS:Ce is very broad covering both blue and green portions of the visible spectrum, i.e., 440 to 660 nm with a peak at around 500 nm. A full color ACTFEL display device can be obtained by adding a red emitting phosphor, such as CaS:Eu or one that has a red component in its emission spectrum. With such a combination of films, one can build a white light emitting phosphor stack. White phosphor structures can then be laminated with primary color filters to build a color display which is very cost effective in terms of production.

Thin film electroluminescent phosphor materials operate based on the conduction of electrons through the phosphor material as a result of a high (e.g., 1 to 5 MV/cm) electric field. The phosphor material behaves as a very wide bandgap semiconductor and charge is transported across the phosphor film at electric fields higher than a threshold value. The phosphor film is generally sandwiched on both sides by a pair of insulating materials which do not break down nor substantially conduct current at such operational electric fields. The electric field is applied using conducting electrodes deposited onto the surface of the insulating material. The resulting device is known as an alternating current thin-film electroluminescent (ACTFEL) device. The electrons that cause the light emission of ACTFEL devices are thought to originate from the regions proximate the interfaces between the phosphor material and the adjacent layers. In particular, the electrons emitted from these regions is thought to be the result of the quantum states of defects within the crystalline lattice. The brightness is related to the number of electrons that are emitted from these quantum states that move with an energy equal to or greater than that necessary to excite the luminescent atoms in the phosphor film, such as the dopants. The amount of light emitted from the phosphor (brightness) is a critical property of the electroluminescent device because brighter displays are easier to read in bright ambient light, such as sunlight.

The number of electrons which tunnel into the conduction band and contribute to the luminescence of ACTFEL phosphor material is limited by the energy depth and density of the quantum states of the defects. Unfortunately, the energy and density of these quantum states are difficult to control. Accordingly, it is difficult to control the brightness of the display.

Another important ACTFEL device characteristic is its efficiency, which is critical for battery operated applications. The efficiency of an ACTFEL device is related to the energy and density of the quantum states, which as previously mentioned are difficult to control. Accordingly, it is difficult to improve and control ACTFEL device efficiency.

It has been observed that many thin-film phosphor materials have a tendency to change in luminance after prolonged use, generally referred to as aging. More particularly, the defects at the interfaces between the phosphor material and the respective insulating material are thought to migrate towards or away from their respective interface resulting in long term changes in the electrical and optical properties of the device. It is the defects at the interfaces which are considered to be the source of the electrons for luminance of the ACTFEL device. This aging phenomena, if severe, results in an unusable display after prolonged use which is unacceptable for many applications. In addition, when a grey scale is applied to an ACTFEL device the aging changes the relative luminance of the grey scale levels relative to each other which results in an overall dimmer display where the image appears improper.

What is desired, therefore, is a phosphor material suitable for ACTFEL devices that increases the brightness of the device, increases the efficiency of the device, and decreases the effects of aging of the device.

SUMMARY OF THE INVENTION

The luminance of a phosphor suitable for an alternating current thin-film electroluminescent device is substantially improved according to the present invention by including an alkali halide. The alkali halide included within the bulk of the phosphor material results in providing a significant number of trapping states which act as donors or acceptors within the a phosphor material. The addition of the trapping states (added defects) within the bulk tend to control the electrical and optical characteristics of the phosphor material. This reduces asymmetric light output characteristics of traditional phosphor material, reduces asymmetric current movement within the phosphor material, and decreases the influence of the interfaces between the phosphor material and insulating materials resulting in decreased aging.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
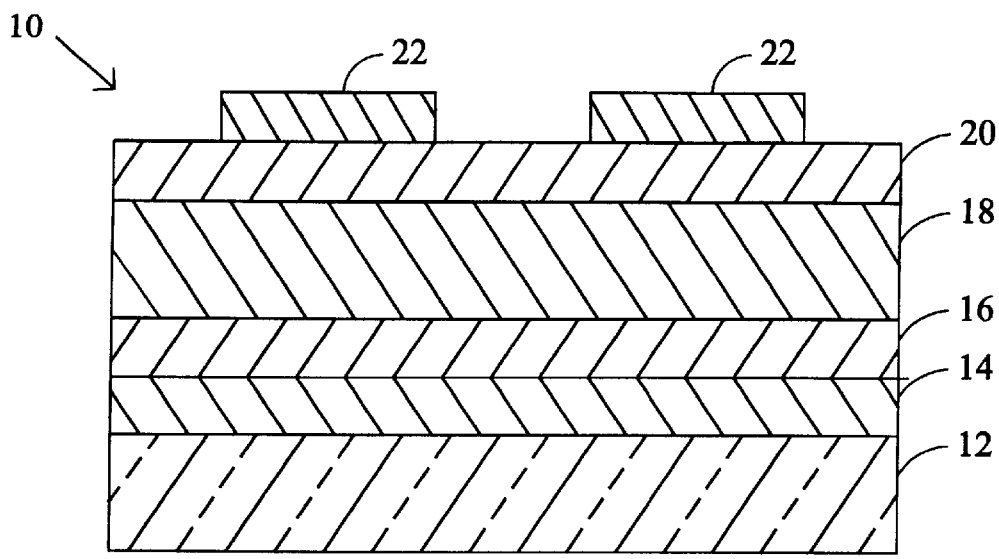
FIG. 1 is a partial side cutaway view of an ACTFEL device constructed according to the invention.

Referring to FIG. 1, an alternating current thin-film electroluminescent device 10 includes a glass substrate 12 onto which is deposited a layer of indium tin oxide (ITO) 14. An insulator layer 16 comprising an aluminum/titanium oxide is deposited on the ITO 14. A phosphor layer (material) 18 includes one or more thin films. The phosphor layer 18 is sandwiched by a second insulator 20 preferably made of barium tantalate (BTO). Aluminum electrodes 22 are placed atop the BTO layer 20. The first insulator layer 16 is preferably approximately 260 nanometers thick and is deposited by atomic layer epitaxy (ALE). In an alternative embodiment, either dielectric (insulator) layer 16 or 20 may be removed. The electroluminescent phosphor layer 18 is preferably 600 nanometers to 2 micrometers thick and is deposited by sputtering. During deposition of the phosphor, the substrate temperature is typically held to between 75 degrees and 500 degrees centigrade. The phosphor films can be annealed typically between 550 and 850 degrees centigrade in nitrogen or argon. This is followed by the deposition of the second insulator layer 20 which is preferably 300 nanometers of BTO. The top aluminum electrodes 22 complete the device fabrication. Red, blue, and green filters may be interposed between the bottom electrode layer 14 and the viewer (not shown) to provide a filtered full-color ACTFEL display, if desired.

Figure 2:
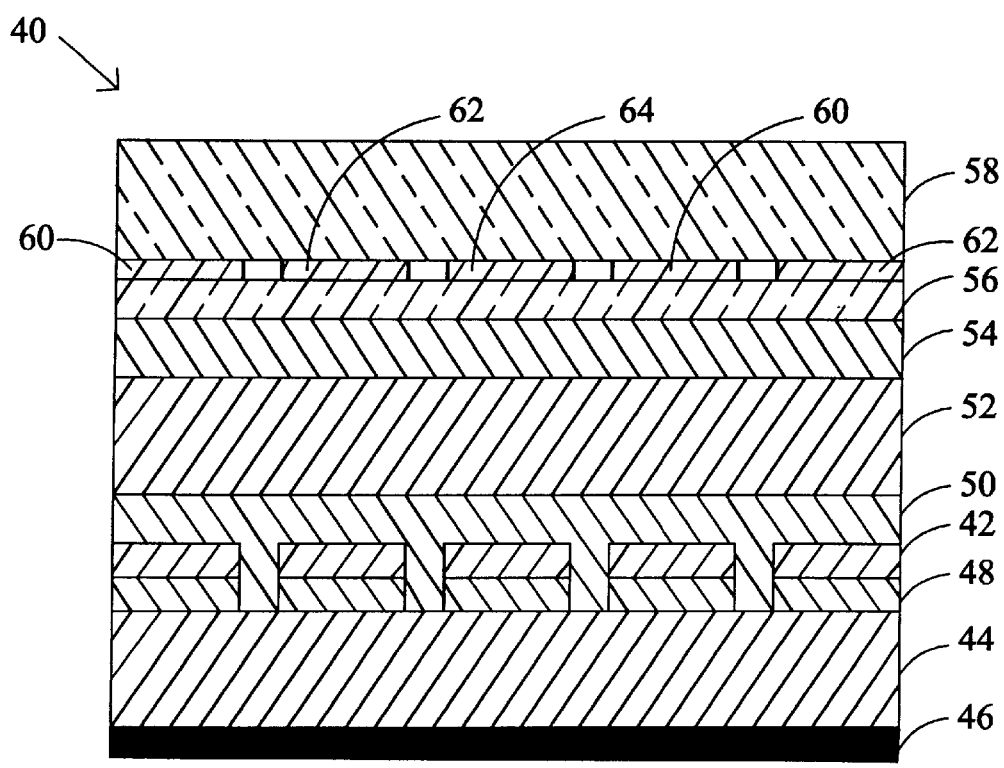
FIG. 2 is a partial side cutaway view of an alternative embodiment of an ACTFEL device made according to the invention.

FIG. 2 shows an "inverted" structure electroluminescent device 40 that is similar to FIG. 1. The device is constructed with a substrate 44 that preferably has a black coating 46 on the lower side if the substrate 44 is transparent. On the substrate 44 are deposited rear electrodes 48. Between the rear electrodes 48 and the rear dielectric layer 50 is a thin film absorption layer 42. An electroluminescent layer 52 which may be a laminated structure is sandwiched between a rear dielectric layer 50 and a front dielectric layer 54. In an alternative embodiment, either dielectric layer 50 or 54 could be removed. A transparent electrode layer 56 is formed on the front dielectric layer 54 and is enclosed by a transparent substrate 58. The substrate 58 may include color filter elements 60, 62, and 64 filtering red, blue, and green light, respectively, if desired.

The present inventors came to the realization that thin-film phosphor material suitable for ACTFEL devices have small grain boundaries that do not tend to align well with one another. The resulting poor crystalline structure tends to trap or otherwise interfere with the movement of free electrons within the phosphor material resulting in poor electrical and optical properties of the phosphor material. The present inventors in an attempt to improve the electrical and optical characteristics of the phosphor material added a flux dopant material to the phosphor material to increase the grain size. The flux material was intended, in effect, to coat the grain boundaries during annealing so that the defects would more readily move within the phosphor material creating larger uniform crystal structures. Alkali halide materials were selected as the flux material because of its relatively low melting point of around 700 to 1000 degrees centigrade. In comparison, ZnS:Mn phosphor material has a melting point of approximately 1700 degrees centigrade. The result is that during annealing the alkali halide dopant will be much more mobile than the host ZnS:Mn phosphor material and will assist the transport of the other atoms resulting in grain growth. The purpose of adding the alkali halide material as a dopant to the phosphor material was to increase the grain size which can provide a more uniform crystalline structure. The more uniform crystalline structure should result in increased grain size and quality, and corresponding improved electrical and optical properties. The addition of the flux material only resulted in about a factor of two increase in the grain size.

To the astonishment of the present inventors the addition of an alkali halide dopant also resulted in a substantial increase in the brightness of the phosphor material which could not be explained by minimal grain size increase. In addition, it was observed that the efficiency of the phosphor material was likewise substantially increased. Also, to the present inventors utter amazement the aging characteristics of the phosphor material improved. With this observed improvement in phosphors material characteristics the present inventors considered the possible source for such an unexpected improvement not explainable by the marginal grain size growth.

The doping of the bulk of the phosphor material with an halide, such as chlorine or bromine, likely results in providing a substantial number of donor states within the bulk of the phosphor material analogous to donor doping of traditional semiconductors. The halides which have one more valence electron than the sulfur which they replace resulting in the trapping of one extra free electron. With a substantial number of added defects (trapping states) included within the bulk phosphor material, the bulk of the phosphor material may provide free electrons under an appropriate electrical field. This tends to control the electrical and optical characteristics of the phosphor material. As such, any changes or differences in the characteristics of the interfaces between the phosphor material and the respective insulating material, which was previously considered to control the operational characteristics of the phosphor material, will have limited impact on the device characteristics. The effect of the interface characteristics is limited because they provide relatively few free electrons in comparison to the doped bulk phosphor material. Because the halide distribution within the bulk phosphor material is uniform and symmetric in nature, the electrical current (free electrons) provided by the halides within the bulk will be substantially symmetric in nature. When positive or negative voltages are imposed across the phosphor material the resulting current will be substantially symmetrical in nature. In addition, the substantially symmetric current flow will result in symmetric luminance output from the phosphor material. This is in contrast to previous phosphor materials where the different defect distributions at the respective interfaces resulted in an asymmetric electric threshold field within the phosphor material, an asymmetric current with the phosphor material, and an asymmetric luminance output from the phosphor material depending upon the polarity of the voltages.

The present inventors also speculate that doping of the bulk, which is substantially uniform in nature throughout the phosphor material, results in a relatively uniform energy and density of the associated quantum states. The concentration and uniformity of the bulk phosphor material doping can be controlled relatively well during processing, unlike the characteristics of the interfaces of the phosphor material and the adjoining insulating materials, which allows increased control over the efficiency and aging characteristics of the resulting ACTFEL device.

ZnS:Mn is the preferred ACTFEL phosphor to which the alkali halide dopant is added because of the high number of ACTFEL devices incorporating ZnS:Mn. However, it is to be understood that any phosphor material for ACTFEL devices may likewise be used. The ZnS thin-film phosphor material used in accordance with this invention is preferably formed by sputtering. However, it is to be understood that any suitable technique may likewise be used on any suitable ACTFEL phosphor material, such as for example, atomic layer epitaxy (ALE), solution based evaporation, vacuum evaporation techniques, chemical vapor deposition, or included within the phosphor material by co-deposition.

The alkali halide is preferably added into the phosphor material by fabricating a thin layer of the alkali halide on the surface of the phosphor material. The phosphor material coated with an alkali halide is then subjected to a heat treatment to cause the alkaline halide dopant to diffuse into the phosphor material. The preferred heat treatment is an annealing process at 700 to 1000 degrees centigrade. Alternatively, the alkali halide dopant may be incorporated during deposition of the phosphor material.

Figure 3:
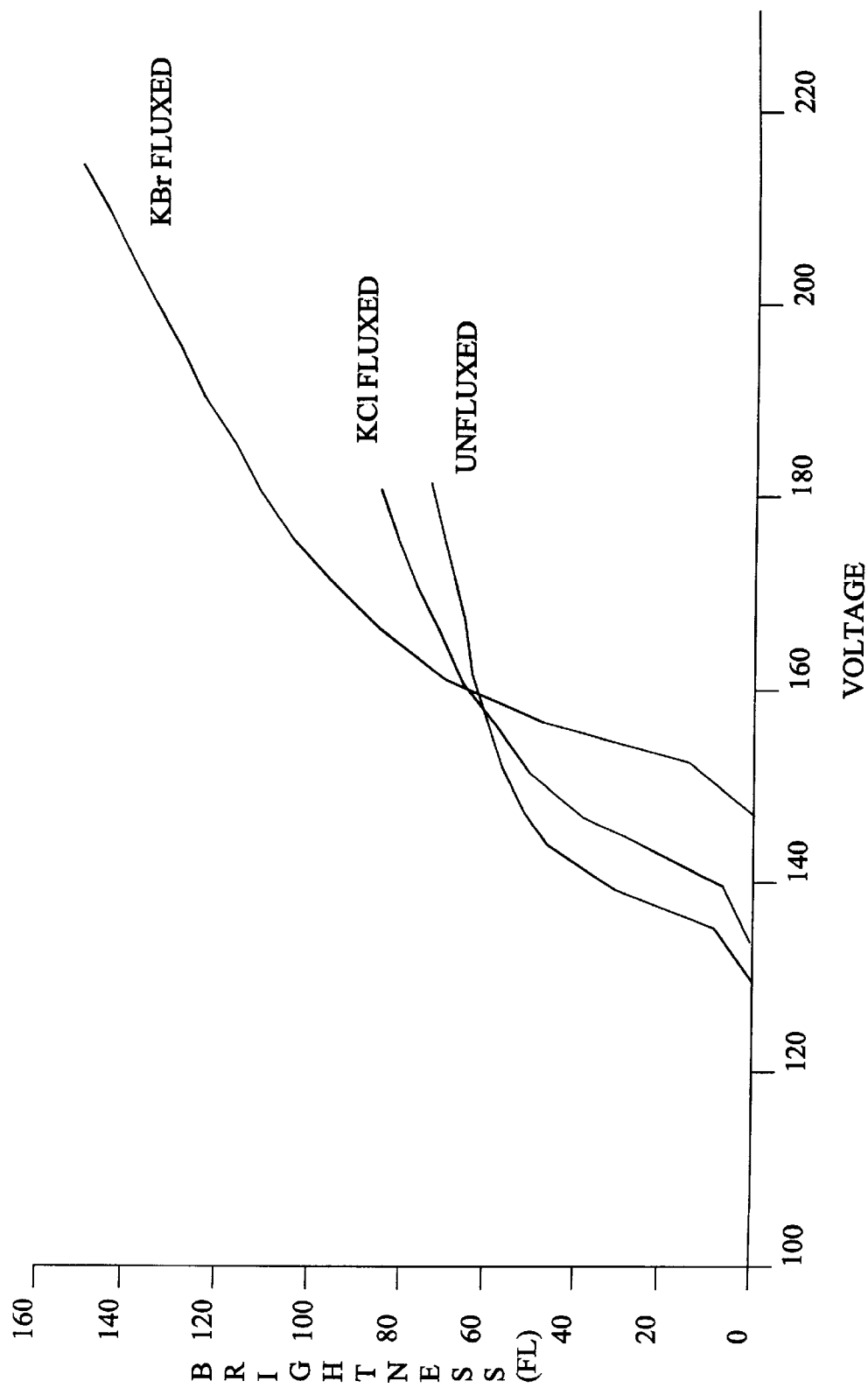
FIG. 3 illustrates brightness versus voltage curves for two different dopants in radio-frequency magnetron sputtered deposited thin film ZnS:Mn.

Referring to FIG. 3, ZnS:Mn with KCl flux and ZnS:Mn with KBr flux illustrates the increase in brightness. It is to be understood that any alkali (lithium, sodium, potassium, rubidium, cesium) halide (fluorine, chlorine, bromine, iodine) may be used, as desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An alternating current thin-film electroluminescent device comprising:
    (a) front and rear sets of electrodes sandwiching a pair of insulators, said pair of insulators sandwiching thin film electroluminescent phosphor material therebetween; and
    (b) said phosphor material comprising an alkali halide wherein said alkali is taken from the group lithium, sodium, potassium, rubidium, and cesium, and said halide is taken from the group fluorine, chlorine, bromine, and iodine.

2. The light emitting phosphor of claim 1 wherein said alkali is potassium.

3. The light emitting phosphor of claim 1 wherein said alkali is at least one of lithium and sodium.

4. The light emitting phosphor of claim 1 wherein said halide is chlorine.

5. The light emitting phosphor of claim 1 wherein said halide is bromine.

6. The light emitting phosphor of claim 1 wherein said halide is fluorine.

7. The light emitting phosphor of claim 1 wherein said halide is iodine.

8. The light emitting phosphor of claim 1 wherein said phosphor material includes ZnS:Mn.

9. The light emitting phosphor of claim 8 wherein said alkali is potassium.

10. The light emitting phosphor of claim 8 wherein said halide is bromine.

11. The light emitting phosphor of claim 8 wherein said halide is chlorine.

* * * * *